L. A. FRAYER & C. O. HOWARD.

ROTARY VALVE.

APPLICATION FILED APR. 22, 1909.

Reissued May 3, 1910.

13,108.

Witnesses
O. B. Bilknap
James F. Berry.

Inventors
Lee A. Frayer
Charles O. Howard

By Whittemore, Hulbert & Whittemore
Attys.

UNITED STATES PATENT OFFICE.

LEE A. FRAYER AND CHARLES O. HOWARD, OF COLUMBUS, OHIO, ASSIGNORS, BY MESNE ASSIGNMENTS, TO THE KOUNS MANUFACTURING COMPANY, OF DETROIT, MICHIGAN, A CORPORATION OF MICHIGAN.

ROTARY VALVE.

13,108. Specification of Reissued Letters Patent. Reissued May 5, 1914.

Original No. 908,656, dated January 5, 1909, Serial No. 392,548. Application for reissue filed April 22, 1909. Serial No. 491,657.

*To all whom it may concern.*

Be it known that we, LEE A. FRAYER and CHARLES O. HOWARD, citizens of the United States of America, residing at Columbus, in the county of Franklin and State of Ohio, have invented certain new and useful Improvements in Rotary Valves, of which the following is a specification.

Our invention relates to improvements in a rotary valve, especially in the means of mounting the same and in the provision for the intake of the fuel, and for the exhaust of the burned gases, the said valve, in one point of its rotation, also providing the head against which the explosion takes place. In other words our valve performs the four functions requisite in a gas engine, namely, it admits the charge, holds the same during the explosion, and permits the exhaust of the burned gases; further our improved valve is so mounted that its weight is not borne by the valve chamber walls, nor is it in contact therewith, but it is carried in bearings adjacent the ends of the valve body.

Figure 1:
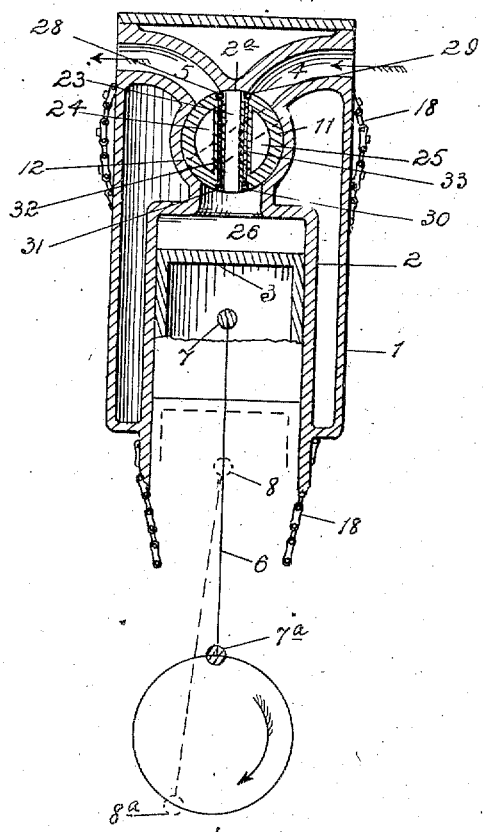
Figure 2:
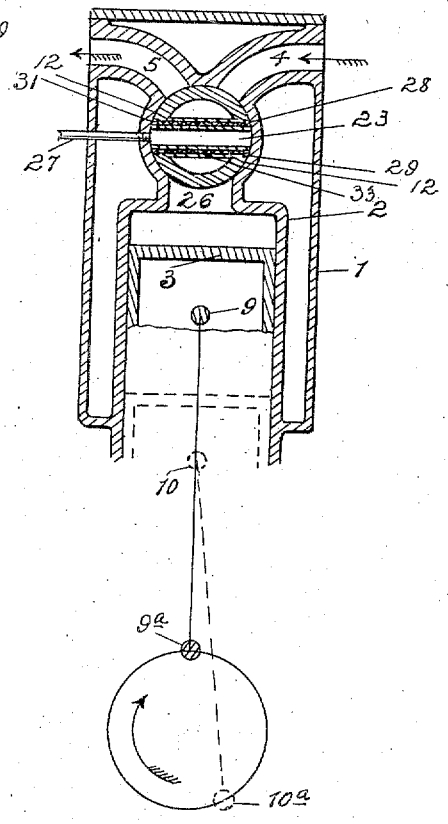
Figure 3:
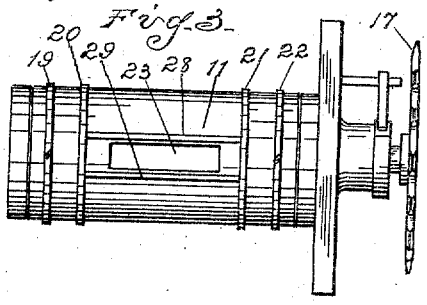
Figure 4:
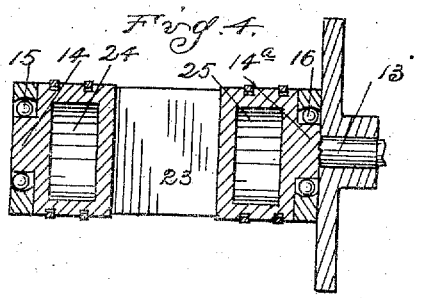

In the accompanying drawings which are hereto attached and hereby made a part of this specification, Figure 1 indicates a vertical transverse view through an upright gas engine with the valve in place; Fig. 2 is a view similar to Fig. 1, with the valve in a different point in its revolution; Fig. 3 is a side view of the valve showing the opening therethrough; Fig. 4 is a longitudinal transverse section through the valve showing means for mounting the same.

Referring to the drawings, 1 is an engine casing, having positioned therein in a suitable manner the cylinder 2, having operatively located therein the piston 3; the fuel inlet is shown at 4, while the passage for the exhaust is shown at 5. The piston rod represented by the line 6, is pivotally secured to the piston over the pin 7. We have represented the movement of the crank diagrammatically in Figs. 1 and 2, and when the piston is in the position indicated in Fig. 1, the lower end of the piston rod connected with the crank shaft will be at the inner point of its travel, as at $7^a$. In this position of the parts, it will seen that the valve 11 is so positioned in its seat that both the inlet and exhaust passages are closed, the upper end of the opening 23 through the valve being positioned opposite the dividing wall $2^a$ between the intake and the exhaust passages. Assume that the movement of the crank shaft in Fig. 1 is in the direction indicated by the arrow, and when the piston has returned to the position 8, the lower end of the piston rod will occupy the position designated as $8^a$; while the piston has been traversing this distance, the valve 11 has been rotated in the same direction by means of the sprocket wheel 17 and the sprocket chain 18, to occupy the position shown in dotted line in Fig. 1, in which position there is neither admission of fuel nor exhaust. In reaching this position, the valve opening 23 has communicated with the inlet passage 4, thereby admitting a charge into the head of the cylinder; and in the position of the parts thus shown the charge is confined in the head of the cylinder or explosion chamber designated at 26, awaiting compression.

Referring to Fig. 2, it is seen that the piston has moved upwardly from the piston indicated by the numeral 8 to the position indicated by the numeral 9, the charge undergoing compression. The charge is now fired, and the rotation of the valve continuing, it is brought around to the position shown in the dotted lines in Fig. 2, the piston meanwhile having returned to the position indicated at 10, while the lower end of the piston rod has reached the point indicated at $10^a$. The rotation continuing, the passageway 23 through the valve, communicates with the exhaust passage 5 and the burned gases thereupon rush out through the valve into the exhaust passageway 5, their exit being assisted by the inward movement of the piston. The rotation of the valve continues, and the piston shown in Fig. 1 is reproduced, although it is seen that the valve has completed only one-half revolution.

The travel of the valve through the next half-revolution would bring about the same conditions as hereinbefore described, namely, the admission of the charge, the compression of the same, the firing of the same, and the exhaust of the burned gases, all of these operations taking place twice in each revolution of the valve.

The valve is substantially cylindrical and is mounted in its chamber concentrically therewith in the manner shown in Fig. 4, the ball bearings 15 and 16 being located in the races adjacent the opposite ends of the valve, and the valve being reduced in the regions 14 and 14ª to be journaled in the said bearings. Therefore, the valve, in this construction, is not in contact with the valve chamber walls 12, and consequently the latter are not worn thereby. Not only are the valve chamber walls not worn, but the rotation of the valve is much more easily accomplished by mounting the same in the bearings. To prevent the escape of the gas longitudinally of the surface of the valve, which, as stated, is at no point in bearing contact with the valve chamber walls, we provide the packing rings 19, 20, 21 and 22, arranged at each side of the opening 25 through said valve; these packing rings are preferably split and as the valve rotates, they are capable of some expansion, and there being preferably a plurality provided at each side of the opening 23, the gas will have no opportunity of escaping in a longitudinal direction.

Inasmuch as the valve is mounted in the bearings adjacent its ends and is not at any point in contact with the walls of the valve chamber in which it operates, it is necessary to provide a sealing means between the circumference of said valve and the concave face of the valve chamber; this is preferably accomplished by admitting oil through oil tube 27, which is inserted through the casing 1 and the valve chamber wall, so that oil flowing through said tube in a quantity which may be regulated in any convenient manner, will enter the circumferential space between said valve chamber walls and said valve. The oil will distribute itself along the length of the valve during the rotation of the latter, and on account of the capillary attraction, will form a film between the said surfaces, which will act as a seal to prevent the gas in the explosion chamber from flowing outwardly circumferentially of said valve. The clearance given to the valve mounted in our improved manner will be approximately two-thousandths (.002) of an inch, a clearance large enough to permit the escape of an appreciable quantity of gas, and yet small enough to be efficiently sealed by introduction of oil through the tube 27 as above described. It is distinctly understood that the oil admitted as stated is not for the purpose of providing a bearing, for the reason that it is one of the objects of our improvement to maintain the valve out of contact with the valve chamber walls, the only bearings being adjacent the ends of the valve. Further, to prevent the escape of the gas except through the valve opening 23, we provide a longitudinal packing strip at each side opening 23, designated in the drawings at 28, 29, 30 and 31; these strips are let into shallow channels on the face of the valve, and are pressed outwardly by the springs shown at 32 and 33, the latter being preferably coil springs inserted through suitable holes bored in the valve at the sides of the opening 23. The longitudinal packing strips being thus spring pressed, will constantly maintain contact with the inner face of the valve chamber and thereby cut off the escape of the gas from the cylinder circumferentially of the valve.

The valve is driven by the sprocket 17, mounted upon the stem 13, and its movements are therefore positively controlled; the chambers 24 and 25 are provided in the body of the valve for the purpose of directing a cooling fluid therethrough.

Having described our invention, what we claim is:

1. In an explosive engine a rotary valve journaled adjacent its ends in bearings whereby it is maintained out of contact with the valve chamber walls, said valve having a passageway therethrough adapted at one point in each half revolution to admit a charge to the explosion chamber, and at another point in each half-revolution to permit the discharge of the burned gases therethrough, and means for driving said valve.

2. In an explosive engine a rotary valve journaled in bearings adjacent its ends whereby said valve is maintained out of contact with the valve chamber walls, said valve having a passageway therethrough, packing rings mounted on said valve at each side of said passageway, said valve in each half-revolution thereof admitting the charge, providing a head against which the explosion takes place, and affording egress for the burned gases.

3. In an explosive engine a rotary valve having a diametrical passageway therethrough and journaled adjacent its ends in bearings whereby said valve is maintained out of contact with the valve chamber walls, packing rings mounted on said valve adjacent said passageway, means for positively actuating said valve to cause the same during each half revolution thereof to admit the charge, to provide a head against which compression and explosion may take place, and to permit the escape of the burned gases.

4. A rotary valve having a transverse passageway therethrough, said valve being chambered to admit a cooling fluid, bearings for said valve adjacent its ends whereby the said valve is maintained out of contact with the valve chamber walls, packing rings adjacent said passageway, and mechanical means for actuating said valve, the inlet and exhaust passages being so arranged relative to said passageway that at each half revolution of said valve, the charge is admitted, compressed and fired, and the burned gases permitted to escape.

5. In an explosive engine a cylindrical rotary valve journaled in bearings adjacent its ends whereby said valve is maintained out of contact with the valve chamber walls, said valve having a fuel passageway formed diametrically therethrough, packing rings mounted on said valve adjacent said fuel passageway, and sealing means introduced between said valve and the adjacent valve chamber walls.

6. In an explosive engine a cylindrical rotary valve having a fuel passageway formed diametrically therethrough journaled in bearings adjacent its ends, whereby said valve is maintained out of contact with the valve chamber walls, packing rings mounted on said valve adjacent said passageway to prevent the escape of the fuel longitudinally of said valve, sealing means adapted to prevent the escape of fuel circumferentially of said valve, and mechanical means for actuating said valve.

7. In an explosive engine a rotary valve having a fuel passageway therethrough, said valve being journaled in bearings adjacent its ends whereby said valve is maintained out of contact with the valve chamber walls, fluid sealing means provided between said valve and valve chamber walls to prevent the escape of the fuel circumferentially of said valve, and additional means to prevent the escape of said fuel longitudinally of said valve.

8. In an explosive engine a rotary valve having a fuel passageway therethrough journaled in bearings adjacent its ends whereby said valve is maintained out of contact with the valve chamber walls, fluid sealing means between said valve chamber walls and said valve to prevent the escape of said fuel circumferentially of said valve, and means to prevent the escape of fuel longitudinally of said valve, said valve in each half revolution thereof operating to admit the charge, to provide a head against which the explosion takes place and to afford egress for the burned gases.

9. In an explosive engine a rotary valve having a fuel passageway therethrough journaled in bearings adjacent its ends whereby said valve is maintained out of contact with the valve chamber walls, fluid sealing means between said valve chamber walls and said valve and longitudinal packing strips between said valve chamber walls and said valve to prevent the escape of said fuel circumferentially of said valve and means to prevent the escape of said fuel longitudinally of said valve.

10. In an explosive engine a rotary valve having a fuel passageway therethrough journaled in bearings adjacent its ends whereby said valve is maintained out of contact with the valve chamber walls, spring pressed longitudinal packing strips on said valve to prevent the escape of said fuel circumferentially of said valve, and packing rings on said valve to prevent the escape of said fuel longitudinally of said valve, and means for actuating said valve.

11. In an explosive engine a rotary valve having a fuel passageway therethrough journaled in bearings adjacent its ends whereby said valve is maintained out of contact with the valve chamber walls, spring pressed longitudinal packing strips on said valve to prevent the escape of said fuel circumferentially of said valve, fluid sealing means introduced into the valve chamber between said valve and valve chamber walls to prevent the escape of said fuel circumferentially of said valve, and packing rings on said valve to prevent the escape of said fuel longitudinally of said valve, and means for actuating said valve.

12. In an explosive engine, a rotary valve having a fuel passageway therethrough, a valve case, a bearing for said valve for maintaining the same out of frictional contact with its case and fluid sealing means between said valve and its case.

13. In an explosion engine, a ported cylinder, a rotary valve controlling the port of said cylinder, a bearing for said valve for maintaining the same out of frictional contact with its seat, and means for sealing the valve upon its seat.

14. In an explosion engine, a ported valve seat and a ported valve out of frictional contact therewith movable parallel to said seat, and means for sealing between said valve and its seat.

15. In an explosion engine, a ported valve seat and a ported valve out of frictional contact therewith movable parallel to said seat, and means for introducing a sealing fluid between the valve and its seat.

In testimony whereof we affix our signatures in the presence of two witnesses.

LEE A. FRAYER.
CHARLES O. HOWARD.

Signed in the presence of—
GEO. W. RIGHTMIRE,
P. M. HULBERT.